(12) United States Patent
Cirit

(10) Patent No.: US 6,523,156 B2
(45) Date of Patent: Feb. 18, 2003

(54) APPARATUS AND METHODS FOR WIRE LOAD INDEPENDENT LOGIC SYNTHESIS AND TIMING CLOSURE WITH CONSTANT REPLACEMENT DELAY CELL LIBRARIES

(75) Inventor: Mehmet A. Cirit, Saratoga, CA (US)

(73) Assignee: Library Technologies, Inc., Saratoga, CA (US)

(*) Notice: Subject to any disclaimer, the term of this patent is extended or adjusted under 35 U.S.C. 154(b) by 0 days.

(21) Appl. No.: 09/877,998

(22) Filed: Jun. 8, 2001

(65) Prior Publication Data
US 2002/0188918 A1 Dec. 12, 2002

(51) Int. Cl.[7] .......................... G06F 17/50; G06F 9/45; G06F 9/455
(52) U.S. Cl. ................ 716/9; 716/2; 716/5; 716/10; 716/11; 716/12
(58) Field of Search ............... 716/9, 10, 5, 2, 716/11, 12

(56) References Cited

U.S. PATENT DOCUMENTS

| | | | |
|---|---|---|---|
| 5,666,288 A | * 9/1997 | Jones et al. ........... 716/17 |
| 5,953,236 A | * 9/1999 | Hossain et al. ........ 716/11 |
| 6,009,248 A | 12/1999 | Sato et al. ........ 395/500.03 |
| 6,014,506 A | * 1/2000 | Hossain et al. ........ 716/11 |
| 6,058,252 A | 5/2000 | Noll et al. ............ 395/500 |
| 6,080,201 A | 6/2000 | Hojat et al. ........... 703/14 |
| 6,099,580 A | 8/2000 | Boyle et al. ........... 716/7 |
| 6,167,557 A | 12/2000 | Kudva et al. .......... 716/6 |
| 6,321,371 B1 | * 11/2001 | Yount, Jr. ............ 716/17 |
| 6,404,226 B1 | * 6/2002 | Schadt ............... 257/203 |

* cited by examiner

Primary Examiner—David Nelms
Assistant Examiner—Ly Duy Pham
(74) Attorney, Agent, or Firm—Beyer, Weaver & Thomas, LLP.; Mary R. Olynick, Esq.

(57) ABSTRACT

Disclosed is a method of generating an integrated circuit (IC) layout design. An initial layout netlist having a plurality of original cells is provided. A first original cell within the initial layout netlist is replaced with a first replacement cell having a different drive than the first original cell's drive but a same replacement delay as the first original cell when the first original cell is not optimal. The first replacement delay of a particular cell is the particular cell's total delay contribution to a particular delay path that includes the particular cell.

26 Claims, 8 Drawing Sheets

APPARATUS AND METHODS FOR WIRE LOAD INDEPENDENT LOGIC SYNTHESIS AND TIMING CLOSURE WITH CONSTANT REPLACEMENT DELAY CELL LIBRARIES

BACKGROUND OF THE INVENTION

The present invention relates generally to integrated circuit design. More specifically, the invention relates to mechanisms for timing optimization.

FIG. 1 illustrates a conventional integrated circuit design flow 100. Initially, the circuit's behavior is described in a high level language in a design entry procedure 102. Logic synthesis tools then transform the high level description into a listing of logic cells (logic netlist) and interconnection information in a synthesis procedure 104. The logic cells correspond to cells within a standard cell library. In general terms, logic circuit synthesis generates an initial circuit topology that satisfies the basic logic requirements as defined by the high level design description. The initial design can be presented graphically as a schematic and also in a data file listing the included logic elements and their interconnections. This data file is generally referred to as a netlist.

The timing optimization procedures (106, 110, and 114) are described further below, and a description of such optimization procedures is skipped for now so as to more clearly describe the other operations of the design flow. After synthesis, the cells listed in the layout netlist are obtained from the standard library and arranged within a design layout in a placement procedure 108. The placed cells are then routed together in operation 112. The cells are placed and routed together into a layout design that is equivalent to the original design description, as well as the layout design netlist. Said in another way, the layout netlist (and original high level description) is in effect transformed into a design layout having interconnected cells.

Logic synthesis tools map functional groups within the high level description to cells having the same logic function. The standard cell library typically provides a set of discrete implementations of each logic function. The different implementations of a particular logic function are designed to drive different capacitive loads while maintaining similar rise/fall times for multiples of a standard load, usually one, two, and four. Unfortunately, the different implementations typically have different associated delays.

As shown, timing optimization procedures are typically performed after the synthesis procedure 104, after the placement procedure 108, and after the routing procedure 112. If timing requirements are not met in any of the timing optimization procedures (e.g., 106, 110, or 114), the entire design flow from timing synthesis 104 through timing optimization 114 are repeated. This reiteration of all or part of the design flow may occur numerous times until the timing goals are met. Unfortunately, these reiterations are usually associated with significant design time and costs.

The various optimization techniques operate on the netlist to attain a satisfactory balance between different requirements. Timing assurance especially depends on the process technology and placement of the circuit design. Timing assurance in synthesis has traditionally operated on a discrete set of cell types with a discrete set of drive capabilities. A static timing analysis-based tool is typically used to select among cells of different drive capabilities. Two important parameters that control this selection are the intrinsic load of the cells on the driver cell, which is well known, and also the load of the interconnect wires, which is not known until the final layout of the design and strongly depends on the placement and routing stages.

Wire load is often estimated in the absence of any placement and routing information. These estimates are typically done without any knowledge of the eventual placement of the logic design and, accordingly, deviate significantly from the actual loads. This creates what is called the "timing closure" problem where several iterations are done between the synthesis-based timing optimization and placement until timing constraints are satisfied. To compensate for the changes in the wire loads, the most common techniques include replacing an existing cell with one of higher drive but the same functionality, and duplicating a cell and splitting the original cell's load over the resulting pair.

The netlist changes as the load conditions change. These changes may require additional cells and the removal of other cells (e.g., if they are found to be redundant). One such change usually triggers more changes. There is only a discrete set of sizes available, and after replacement, signal delays through the cells are affected differently when they are replaced with other cells. Changes in sizing of replacement cells vs. replaced cells also impacts the delays of the cells' preceding driver cell(s) because of changes in the input capacitive loading. A replacement cell may have a shorter delay, but its driver may have a longer delay, offsetting any gains in the accumulated delay for the path. The process of finding the right cell is also computationally expensive, as all drive strength choices are typically tried out for every stage of the signal path. This makes the use of more drive strengths in a cell library impractical.

Various solutions have been proposed for the timing closure problem, which include better wire load prediction, integrated timing optimization and placement, "logical effort" and "gain" based timing optimization. The integrated placement and timing optimization compromises the quality of both timing and placement. "Logical effort" and "gain" based optimization over-constrain the placement stage to produce the right wire loads. These last two approaches attempt to avoid the computational cost of using discrete drive strengths by building continuous models of cells, mapping the delay capabilities of the cells versus their size, and using the resulting simplified models to solve the timing optimization problem. After solving the problem using these simplified models, cells based on continuous parameters are mapped to discrete components from the cell library. The wire load values are still required to be known. The quality of the modeling, mapping delay capabilities versus their size, and the number of the discrete choices in the library are critical issues with these approaches. In sum, these two approaches are often computationally complex and inaccurate.

Accordingly, there is a need for an improved design methodology where timing optimization and placement can be preformed independently in the most efficient manner and an initial timing optimization is performed independently of the wire loads.

SUMMARY OF THE INVENTION

Accordingly, the present invention provides improved apparatus and methods for generating design netlists which meet timing and performance specifications of a circuit design. Preferably, power usage is kept low, and the design, placement and routing procedures of chip design flow are kept as independent as possible. These improved apparatus and methods rely on a special cell library having the property of constant replacement delays, as defined below, and preferably a relatively large, but still discrete choices of drive strengths. A set of logic cells is called a "family" if each member implements the same logic function, but the members of a particular family may have different electrical properties, like signal delays depending on the drive and load specifications. In one embodiment of a constant replacement delay cell library, members of each logic family share the same logic function, and the same set of replacement delays, which may be different for different signal paths. Each member of the family is designed to drive a specific load from a sorted set of uniformly increasing loads. Replacement delays of each member under this specific load is the same when the member cell is driven by a typical driver. A cell family thus has a load range, a set of fixed replacement delays for the particular load for each member, and a common set of timing constraints, such as setup and hold times, corresponding to the worst cases among the family members. In one example, the number of cells in each family could be 15–20, in contrast to current constant output rise/fall time libraries which are about 4–5. Each member has a "load slack", which is the difference of the maximum load range of its family and its "natural load", for which it is has been designed and optimized.

In one embodiment, a design netlist is provided. For example, the design netlist was generated by using a high level description language to describe the design circuit's behavior and the high level description functions were then grouped and mapped to standard cells to form the design netlist. The standard cell library could be a subset of the special library. Each cell in the netlist could be replaced with the appropriate member of the logic family depending on the load it needs to drive. The loads at this point include only the self loading of the cells themselves due to their input or gate capacitances. At the end of this process, where timing requirements and wire loads are ignored, every cell is matched to its capacitive loading. If the cells are power optimized, the circuit is the most power efficient implementation. Each cell is driving its "natural load" and has the maximum "load slack." One objective in this embodiment is to find an implementation which will maximize the "load slack" for every cell output. If some cells are overloaded, with little "load slack," their load can be split either among more instances of themselves or multiple instances of buffers. In this implementation, one goal is to maximize the load slack for each cell. This procedure is referred to herein as the "driver replacement."

Timing optimization can be performed on the resulting netlist after "driver replacement." Unlike traditional approaches to timing optimization where the goal is to find a cell for a particular expected load, one goal of timing optimization in this embodiment is to find an implementation which allows for maximum "load slack." Wire load constraints are then determined for each of the outputs of the logic cells within the design netlist. Placement and routing is then performed based on the predetermined wire load constraints to generate the design layout. A second timing optimization is then performed based on the actual wire loads resulting from the routing procedure. This procedure involves replacing a particular cell with another cell from the same family to drive the total load of gate capacitances and interconnect wires, and matches the replacement delay of the original cell with its own replacement delay for the new total load.

Since the replacement cell has the same replacement delay as the replaced cell, it is likely that the timing requirements produced by the first timing optimization are still being met by the resulting netlist after the second timing optimization. However, since timing may be affected by the interconnect effects, variations in the input slopes and variations in the output drive of the cells, which are all second order effects, the timing is preferably re-verified. If timing is still not met, the design layout may have to be adjusted by further cell replacements.

In another embodiment, a method of generating an integrated circuit (IC) layout design is disclosed. An initial layout netlist having a plurality of original cells is provided. A first original cell within the initial layout netlist is replaced with a first replacement cell having a different drive than the first original cell's drive but a same replacement delay as the first original cell when the first original cell is not optimal. The first replacement delay of a particular cell is the particular cell's total delay contribution to a particular delay path that includes the particular cell.

In another embodiment, the invention pertains to a computer readable medium containing program instructions for generating an integrated circuit (IC) layout design. The computer readable medium includes computer readable code for providing an initial layout netlist having a plurality of original cells and for replacing a first original cell within the initial layout netlist with a first replacement cell having a different drive than the first original cell's drive but a same replacement delay as the first original cell when the first original cell is not optimal. The first replacement delay of a particular cell is the particular cell's total delay contribution to a particular delay path that includes the particular cell. The computer readable medium further includes a computer readable medium for storing the computer readable codes.

In yet another embodiment, a computer system operable to generate an integrated circuit (IC) layout design is disclosed. The computer system includes one or more processors and one or more memory. At least one of the processors and memory are adapted to provide an initial layout netlist having a plurality of original cells and replace a first original cell within the initial layout netlist with a first replacement cell having a different drive than the first original cell's drive but a same replacement delay as the first original cell when the first original cell is not optimal. The first replacement delay of a particular cell is the particular cell's total delay contribution to a particular delay path that includes the particular cell.

In yet another aspect, the invention pertains to a method for performing timing optimization. A design netlist having a plurality of cells and associated timing requirements is provided. Timing optimization is performed on the design netlist by ignoring wire load estimates for each cell within the design netlist and maximizing load slack associated with each cell.

In another embodiment, the invention pertains to a method of optimizing a design circuit having a plurality of cells. The design circuit is associated with timing requirements. A constant replacement delay cell library having a plurality of cell families that each include a plurality of cells having different load capabilities and a same replacement delay is provided. A replacement delay of a particular cell within the constant replacement delay cell library is the particular cell's total delay contribution to a particular delay path that includes the particular cell. The design circuit is optimized to meet the timing requirements of such design circuit by replacing one or more cells of the design circuit with cells from the constant replacement delay cell library. The design circuit is optimized for power consumption by replacing one or more cells of the design circuit with cells from the constant replacement delay cell library.

In yet another aspect, the invention pertains to a method for generating a logic family of constant replacement cells. A maximum load, a minimum load, an incremental load, and a single replacement delay are selected for the family. The single replacement delay for the family may vary for different signal paths through the cell, but remains constant across the family. A plurality of standard library cells to be included within the family are generated. Each cell has the selected replacement delays, a same logic function and is capable of driving different loads. The loads associated with the family cells range from the selected minimum load through the selected maximum load in increments of the selected incremental load.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to the specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides an initial load independent timing optimization that is performed on an initial circuit design using a specialized cell library. The specialized cell library contains various logic cells grouped into families. Each family provides members that have different load ratings, but the same logic function, physical footprint, and replacement delay. Additionally, each member of each family is optimized to drive a certain load which is referred to herein as the "natural load" of the member cell. That is, each family contains a plurality of members capable of driving different loads, but with the same replacement delay. The load granularity, the minimum and maximum load, and the number of cells in the family, and particular replacement delays for various signal paths between the inputs and outputs of each member are various design parameters of the cell family. If there are timing constraints like setup and hold times, the largest values among all members are assigned to the family. In one implementation, granularity could be defined as the total load per fanout, and the number of the cells in the family could be the maximum fanout.

Figure 1:
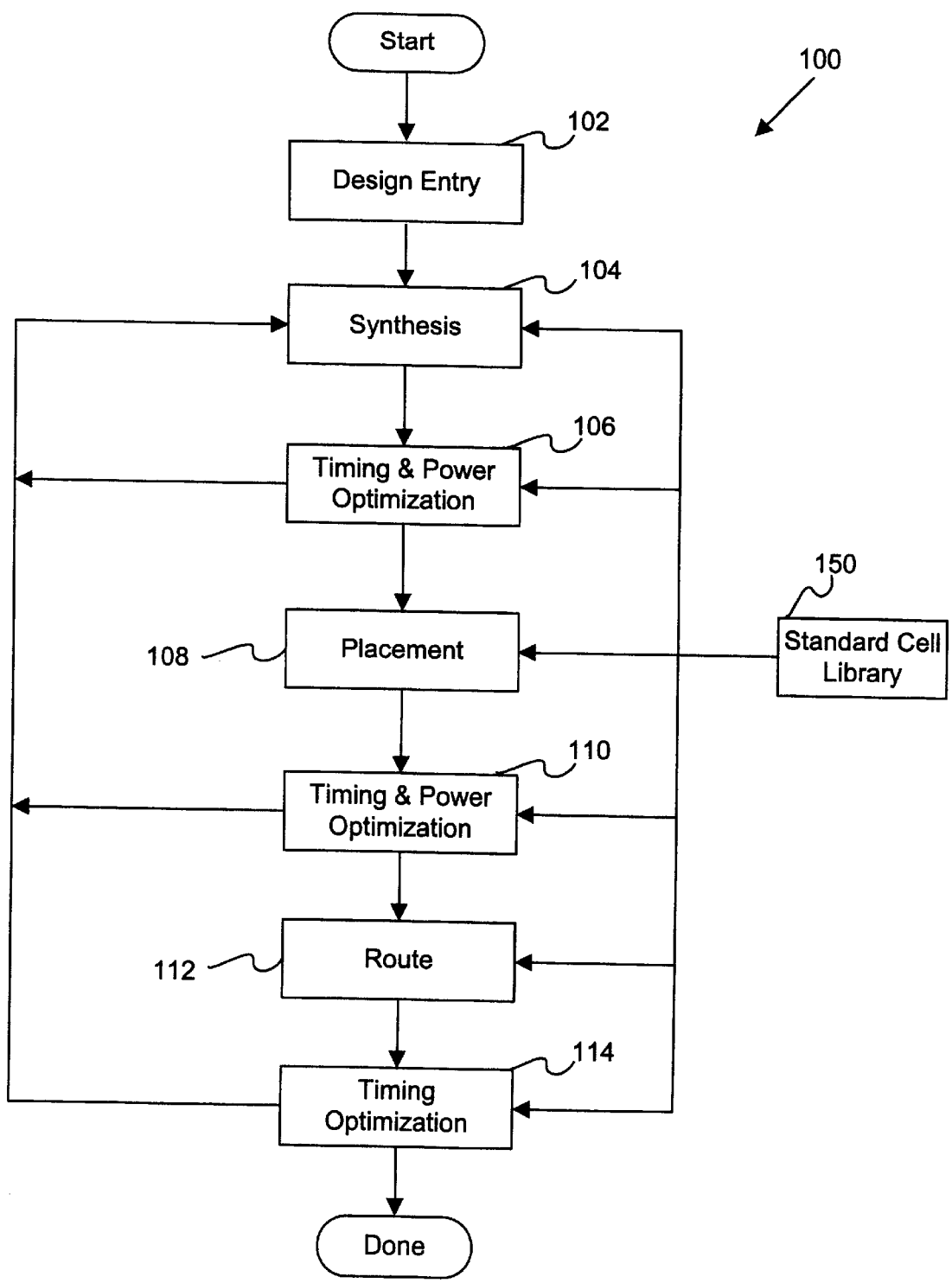
FIG. 1 is a flowchart illustrating a conventional integrated circuit design process.
Figure 2A:
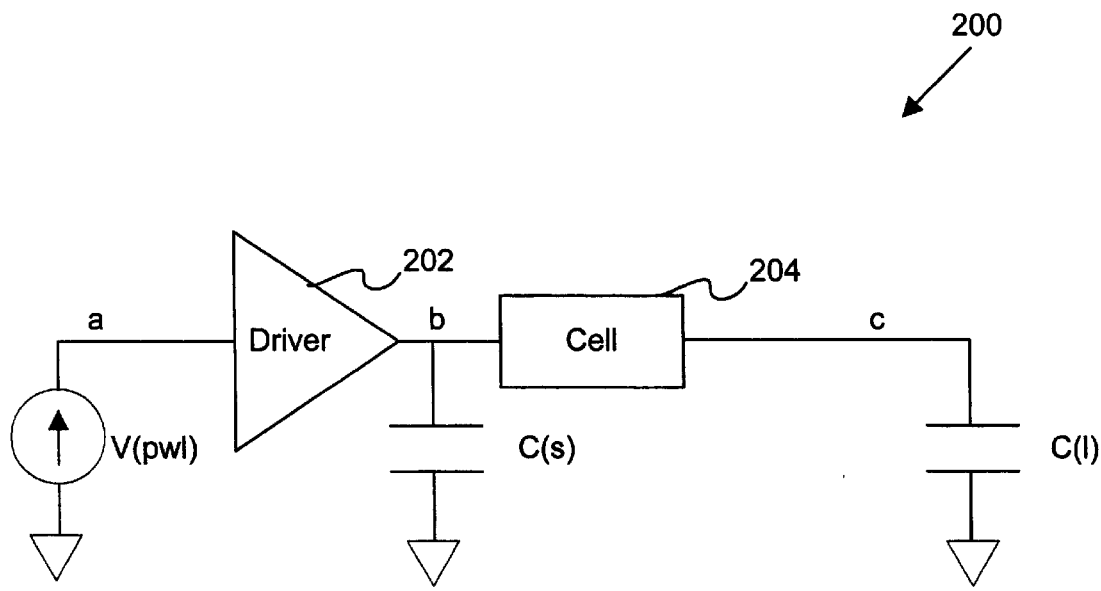
FIGS. 2A and 2B illustrate the concept of replacement delay in accordance with one embodiment of the present invention.
Figure 2B:
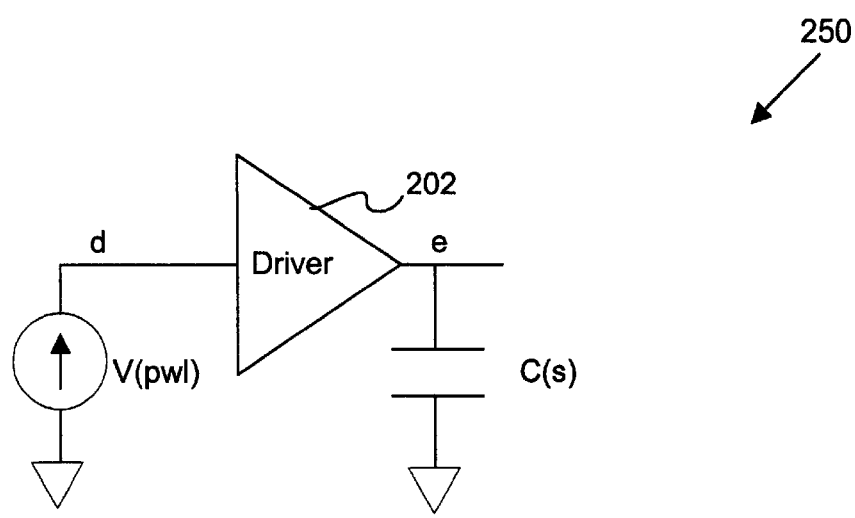

In brief, FIGS. 2A and 2B illustrate the concept of replacement delay using a cell 204 which is part of a logic family. The capacitive load C(l) is an abstraction of the sum of gate and wire loads the cell 204 needs to drive. The driver 202 represents another cell from the netlist which is driving the inputs of cell 204. The driver 202 is a buffer which passes through the ideal input signals supplied by the voltage source V(pwl). Rise and fall times of the driver 202 can be controlled by the capacitive load C(s) which represents gate and wire loads present at the input of the cell 204. The driver 202 and cell 204 is an abstraction of a segment of a signal path in a circuit design. During timing optimization, both the cell 204 and driver 202 may need to be replaced with other equivalent cells to meet timing requirements. The total path delay t(ac) is the sum of the signal delays through the driver 202, t(ab), and signal delay through the cell 204, t(bc):

$$t(ac)=t(ab)+t(bc)$$

FIG. 2B illustrates the same circuit as in FIG. 2A, but the driver 204 and its capacitive load C(l) are removed. The signal delay of driver 202 in this case is t(de). The replacement delay of the cell 204 is defined as:

$$t(r)=t(ab)+t(bc)-t(de)$$

which is conceptually the sum of the internal signal delay through cell 204 and the incremental delay it imposes on its driver 202 as a result of its input capacitance. The replacement delay is the total delay contribution of the cell to the path delay, including from itself and from its preceding driver. If cell 204 needs to be replaced because of a change in the load C(l), the total path delay t(ac) will not change substantially since the new cell has the same replacement delay as the original. The term "constant" is being used in an approximate sense. That is, there could be minor variations within the family in the range of a few picoseconds which do not necessarily impact the total signal delay over a relatively long path. During the cell optimization stage the choice of the driver cell and its load C(s) impacts the accuracy of the replacement delays. The replacement accuracy could be improved by selecting the driver to be a "typical" driver, and by selecting C(s) to have a typical fanout load. Deviations around typical behavior usually cancel each other out improving the reliability of the process.

A cell library with constant replacement delays is used to generate a circuit layout in contrast to constant rise/fall time libraries which are conventionally used for this purpose. In brief, a synthesis is initially performed to satisfy timing requirements without accounting for wire loads resulting from a subsequent routing procedure. Wire load constraints may then be determined for each cell based on the maximum load its logic family is capable of supporting without changing the timing of the design. Placement and routing is performed based on these determined wire load constraints. After placement and routing, actual wire loads are calculated and original cells are replaced with new cells within the family capable of driving the actual wire loads without changing the timing (i.e. the replacement delay for the replaced cells remains constant).

As explained further below, one can keep the timing of the circuit constant by matching the load with the appropriate logic cell from a constant replacement delay cell library. The accuracy of the timing depends on the granularity of the load levels selected. Additionally, since the number of iterations to do timing optimization is finite, there can be a relatively high number of cells within each cell family. In one embodiment, each family has about 15 members, about the maximum fanout expected within the netlists. One can perform this substitution so long as the total load, which is the sum of wire load and gate capacitance, remains within the maximum and minimum load specifications of the cell family.

Timing optimization generally involves gradually replacing cells on a signal path with higher drive members from the same family. During this process "load slack" may be reduced, leaving less flexibility to placement and routing procedures. In order to increase "load slack," which is the difference between the maximum load specification for the cell family and the gate capacitance the member cell needs to drive, one can employ mirroring, which splits the load to increase load slack, or insert multiple buffers on a cell's output. Larger load slacks allow more freedom to placement and routing tools, increasing the quality of the placement and making it easier to meet timing requirements. Consequently, the present invention may also include timing optimization techniques that maximize load slack for each cell.

Figure 3:
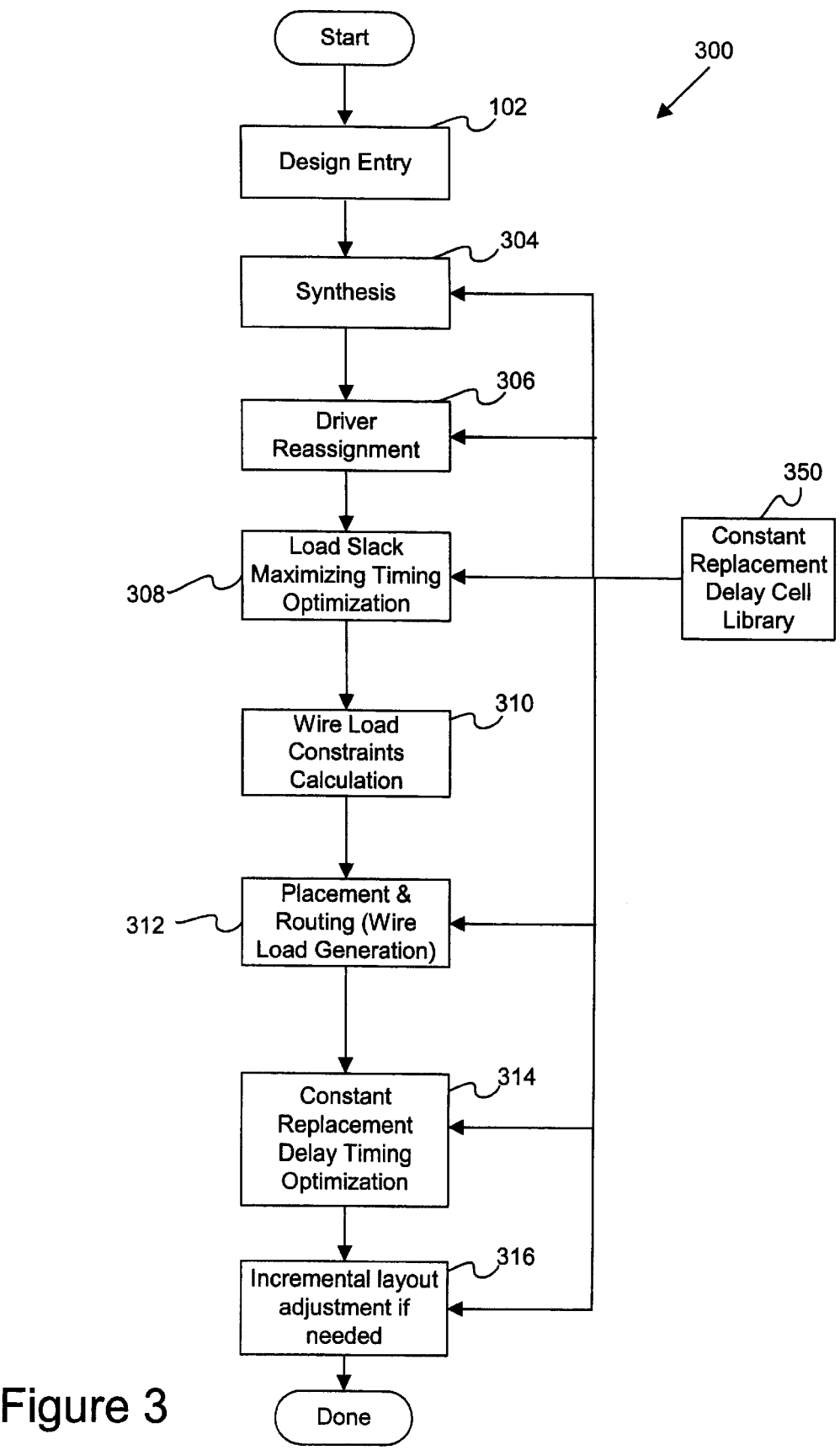
FIG. 3 is a flowchart illustrating a procedure for generating an integrated circuit layout using a constant replacement delay cell library in accordance with one embodiment of the present invention.

FIG. 3 is a flowchart illustrating a procedure 300 for generating an integrated circuit layout in accordance with one embodiment of the present invention. Initially, a design is entered in operation 102. In this design entry procedure 102, a specific integrated circuit (IC) is designed using any suitable type and number of design techniques. Typically, a design tool is used to generate a design netlist or circuit description. The design tool typically includes mechanisms for arranging graphical representations of specific functional blocks into an initial design circuit, as well as mechanisms for representing the initial design with a data file listing the included logic elements and their interconnections. For example, an IC designer may use preexisting schematic library blocks to form the IC device using, for example, electronic design automation (EDA) tools. In some cases, the IC designer may create the IC or part of the IC from scratch with the aid of any suitable design system, such as conventional computer aided design (CAD) tools. For example, the IC designer may use a schematic CAD tool to plan the logic diagrams for a particular IC device. Still further, the IC designer may write a description of the IC device or portions of the IC device with the aid of a hardware design language, such as VHDL.

Synthesis is then performed in operation 304. For example, the netlist (or circuit description) is then passed to a synthesis tool which transforms the netlist into a plurality of standard cells taken from a cell library 350. For example, an inverter function within the netlist is replaced with a standard cell inverter from library 350. As standard synthesis tools prefer cell libraries with small families of cells, it may be preferable to work with a small subset of the cell library 350 for the sake of efficiency. Design entry and synthesis can be performed using standard methods irrespective of the nature of the cell library 350. Output from these procedures is a netlist which uses the cells from library 350 and which represents an implementation of the initial design.

Driver reassignment then occurs in operation 306. Driver reassignment 306 generally includes replacing cells selected by the synthesis tool so that the total gate capacitance seen by each cell is approximately equal to their "natural load." Irrespective of the timing requirements, the circuit netlist after this process is completed has the maximum "load slack." It is also the most power efficient implementation as each cell is matched to its load, assuming that the cells are power optimized for the particular loads they are driving. One embodiment of driver reassignment is described further below with respect to FIG. 4. A load slack maximizing timing optimization 308 may then be performed. Load slack is defined as the difference between the maximum load of a cell family, and the current load member cell needs to drive. Timing of a signal path can be improved by using higher drive cells from the same family. With a large number of cells on the path and given a large selection of cells to use, there are a large number of ways of meeting the timing requirement. This embodiment of the present invention starts with a maximum slack implementation which may be violating the timing requirements, and chooses from among all possible implementations one with the maximum load slack.

Wire load constraints are then calculated in operation 310. Maximum and/or minimum wire loads are determined for each cell output. Additionally, for cells with multiple outputs, the wire loads may be balanced. One embodiment of a technique for determining the wire load constraints is described further below with reference to FIG. 6. After wire load constraints are calculated, placement and routing 312 occurs. One goal of routing is to generate the smallest wire loads meeting the previously calculated wire load constraints.

Wire load constraints are determined and used so that replacement cells may be selected after placement and routing to replace the originally selected cells without any regard to placement and routing procedures. If the calculated load constraints are satisfied during placement and routing, prelayout timing requirements of the logic circuit are most likely to be met(e.g. during subsequent timing optimization 314).

A constant replacement delay timing optimization procedure 314 is then performed. This optimization 314 is based on the actual loads coming out of the placement and routing procedure 312. Each original cell in the layout is replaced with a replacement cell from the constant replacement cell library 350 which has the same replacement for the total load of gate capacitance and wire loads as the original cell had with the gate capacitance load only. Preferably, the cell with the lowest drive that can meet these requirements is selected as the replacement cell. During this process, second order effects that may impact the accuracy of the path delays can be accounted for. These could result from the finite granularity of the cell library, the distributed nature of interconnect wire loads, variations in the output drive, and variations in the input rise/fall times, which may happen as the cells are replaced. If the path delay exceeds the specifications, beginning with the smallest cells on the path, they are replaced with higher drive members from the same family in an incremental layout adjustment operation 316. One embodiment of constant replacement delay timing optimization 314 is described further below with respect to FIG. 7.

Figure 4:
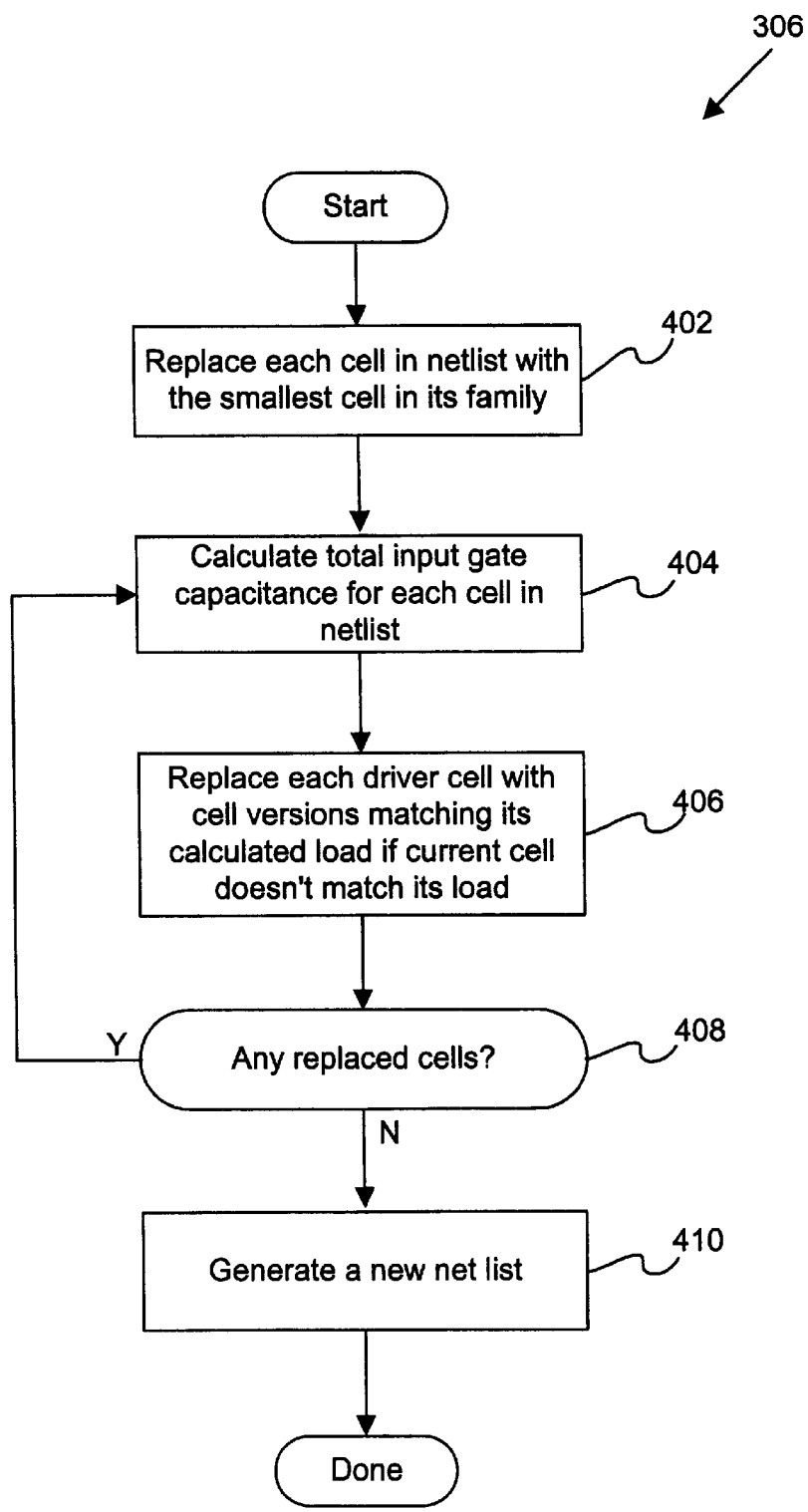
FIG. 4 is a flowchart illustrating the driver reassignment procedure of FIG. 3 in accordance with one embodiment of the present invention.

Any suitable technique may be used to give a starting netlist for the driver replacement procedure. FIG. 4 is a flowchart illustrating the driver reassignment procedure 306 of FIG. 3 in accordance with one embodiment of the present invention. Initially, each cell in the netlist is replaced with the smallest cell in its family in operation 402. It is then determined whether these cells are matching to the load they are driving, ignoring any wire loads. To accomplish this, the total input gate capacitance is then calculated for each cell in the netlist in operation 404. Each driver cell is then replaced with cell versions matching its calculated load in operation 406 if the current cell is not matching the calculated load. It is then determined whether any cells were replaced in operation 408.

If cells were replaced, operations 404 and 406 are repeated, wherein total input gate capacitance are calculated again and cells are replaced to match their loads. If no cells have been replaced, the new netlist is generated in operation 410. Loads are recalculated since cell replacements also impact them. This iterative procedure ends when no cells have been replaced.

At the end of this iterative process, every cell drives its "natural load," without accounting for wire loads. If the cells were optimized for power for their "natural loads," the netlist represents the most power optimal implementation of the logic design. In this embodiment, the driver reassignment process 306 assures that the starting point for timing optimization is a power optimized netlist. In addition, all the cells have the maximum load slack. However, at this point in the design flow, this implementation may not meet the timing requirements. The bigger the load slack, the easier it will be to meet timing specifications, and the more efficient the placement and routing will be. Mirroring and buffering can be used to increase load slack by reducing the fanout.

Unlike standard timing optimization techniques which make assumptions about wire loads at every step of the process, the techniques of several of the specific embodiments generally ignore wire load. The focus of these techniques is to find an implementation which will maximize load slack while meeting the timing requirements. This approach gives the maximum freedom to placement and routing tools, effectively decoupling them from the timing requirements.

Figure 5:
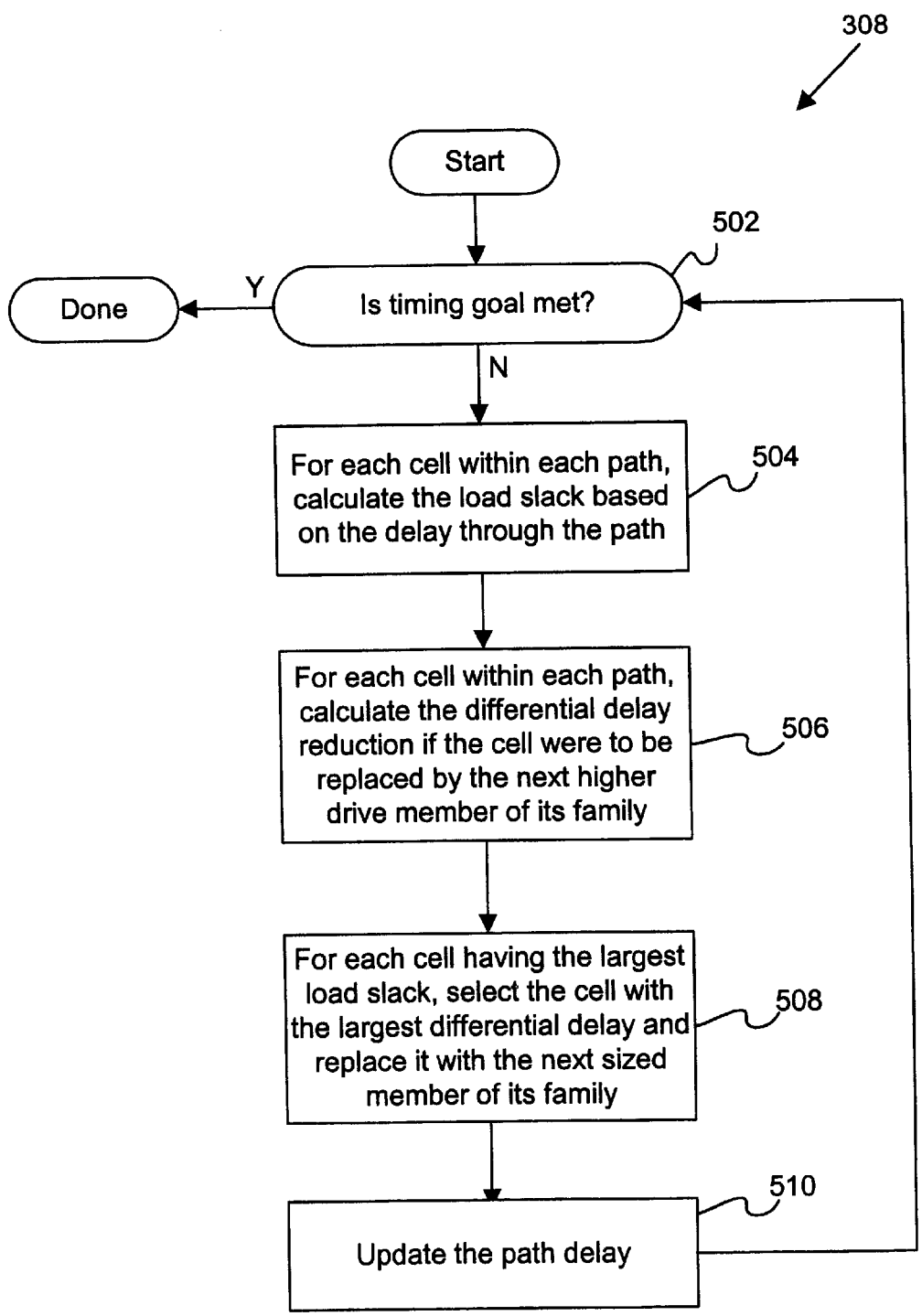
FIG. 5 is a flowchart illustrating the load slack maximizing timing optimization of FIG. 3 in accordance with one embodiment of the present invention.

Assuming that we have a signal path, which is a chain of cells along which a signal propagates, FIG. 5 is a flow chart illustrating the load slack maximizing timing optimization 308 of FIG. 3 for such path in accordance with one embodiment of the present invention. This optimization procedure 308 may, of course, be applied to all paths within the design netlist. Initially, it is determined whether the timing goals have been met for the path being optimized in operation 502. If the timing goals have been met, this optimization 308 ends. If the timing goals have not been met, the load slack is calculated in operation 504. For each cell on the path, a differential delay is calculated which is the reduction in path delay if the cell were to be replaced by the next higher drive member of the cell family in operation 506. (The load slack would be reduced as well if the replacement were actually carried out.) Among all the cells with the largest load slacks, the one with the largest delay reduction is selected for replacement in operation 508. The path delay is then updated in operation 510. The operation 308 for load slack maximizing timing optimization is then repeated in operation 502 until timing requirements are met.

In the illustrated embodiment, selecting the cell with the largest load slack for replacement allows other cells to conserve their relatively smaller load slack values for subsequent wire load additions. In other words, only cells with large load slacks are utilized for timing optimization. Thus, it is more likely that enough load slack remains for the replaced cells (as well as for the other non-replaced cells) for adding wire load during routing. Selecting cells with the largest differential delay speeds up the optimization process with least load slack loss. By way of alternative embodiments, cells may be randomly or sequentially selected to be replaced by higher drive cells until the timing goals are met without regard to load slacks. Timing closure after placement and routing may be severely impacted.

Figure 6:
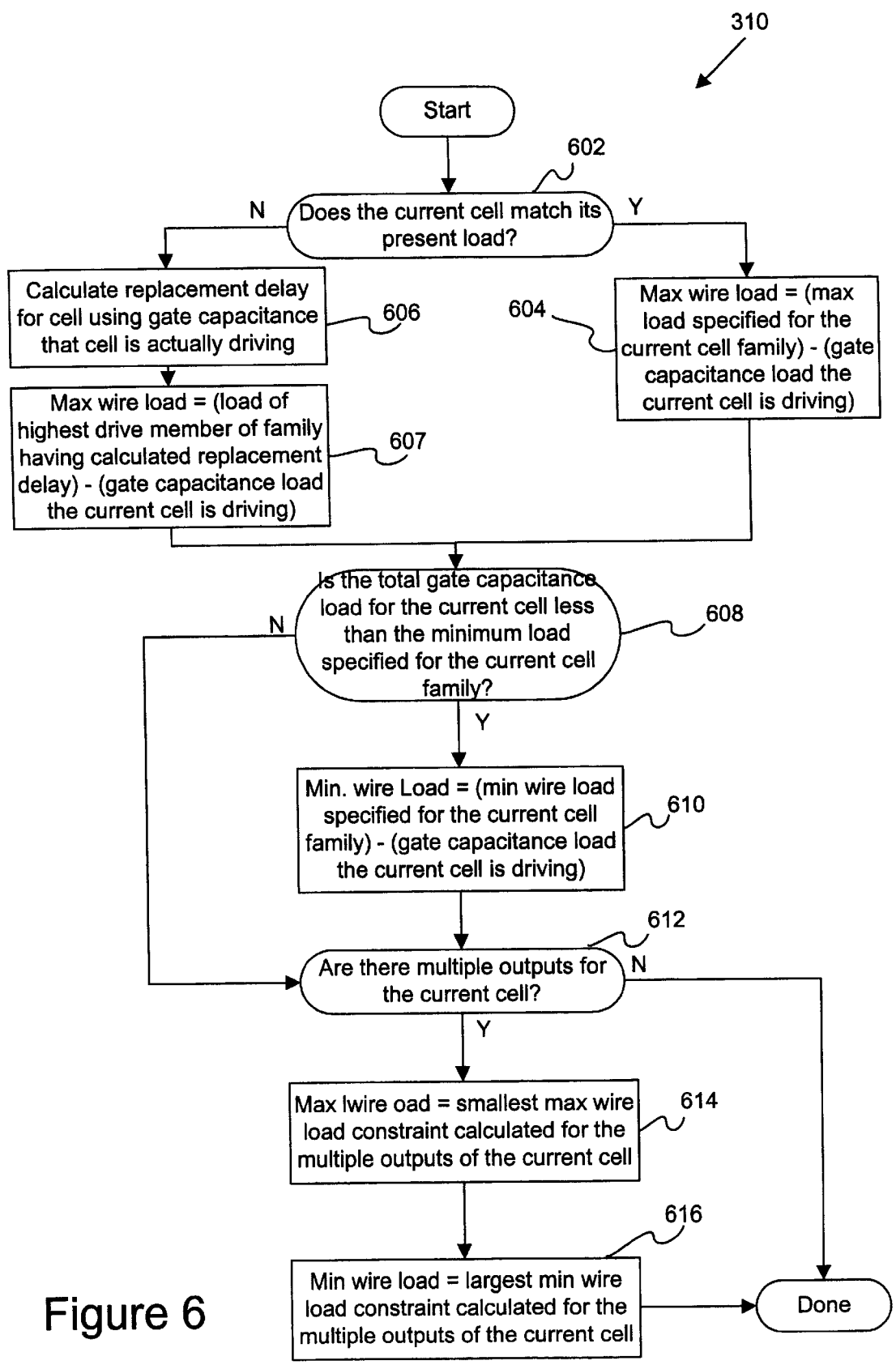
FIG. 6 is a flowchart illustrating the wire load constraint calculation of FIG. 3 in accordance with one embodiment of the present invention.

Any number and type of situations may be addressed to determine wire load constraints for a particular cell. FIG. 6 illustrates one embodiment of the wire load constraint calculation 310 of FIG. 3. Wire load constraint calculations are shown for a single cell. However, this operation 310 is preferably applied to each cell within the layout design. After one or more wire load constraint(s) are determined for a particular cell, a subsequent placement and routing procedure may then generate a wire load for each cell that meets its calculated wire load constraint(s).

In the illustrated embodiment, it is initially determined whether the particular cell matches its present load in operation 602. If the cell's load, excluding wire loads from subsequent routing, is within the "natural load" range for this cell, the maximum wire load cannot be more than the load slack of the cell. In this case maximum wire load constraint is the difference between the maximum load specified for the cell family and the total gate capacitance that the cell is driving in operation 604.

If the cell does not match its load (e.g., the cell is overdriving), which may have happened as a result of the load slack maximizing timing optimization procedure, the replacement delay of the cell is calculated using the gate capacitance that the cell is actually driving in operation 606. The replacement delay is calculated since a cell that was originally selected from a particular family having a particular replacement delay will have a replacement delay that is different than its family's when it is driving significantly less load than it is designed to drive. The maximum wire load is then defined as the difference between the load of the biggest member of the family with the same calculated replacement delay and the gate capacitances that the current cell is actually driving in operation 607. This wire load is the maximum wire load one can accept without impacting the timing. This maximum is preferably comparable to the difference between the maximum load of the cell family and the natural load of the cell. Detailed calculation accounts for any non-linearity and may allow larger load constraints.

It is then determined whether the total gate capacitance load for the current cell is less than the minimum load specification of the cell family in operation 608. If this is true, a minimum wire load constraint is calculated to be equal to the minimum load specification of the current cell family minus the total gate capacitance of the current cell it is driving in operation 610. Minimum wire loads for a cell family may be necessary as it may not be possible to implement a constant replacement delay requirement over a large range of loads. However, by subdividing the load range and allowing smaller delays for intervals with smaller loads, multiple cell families can be generated for different load ranges. In this example, the load constraints include both a maximum wire load constraint and a minimum wire load constraint. However, if the total gate capacitance load for the current cell is not less than the minimum load specification of its cell family, a minimum wire load is not calculated in operation 610.

It then may be determined whether the current cell has multiple outputs in operation 612. If the cell does not have multiple outputs, the operation 310 for determining wire load constraints finishes. If the cell has multiple outputs, wire loads are preferably balanced. That is, the same amount of wire load is added to each output. Accordingly, the maximum wire load is determined to be equal to the smallest maximum wire load constraint calculated for the multiple outputs of the current cell in operation 614. Additionally the minimum wire load constraint is preferably set to the largest minimum wire load calculated for the multiple outputs of the current cell(assuming that a minimum wire load was calculated) in operation 616.

Figure 7:
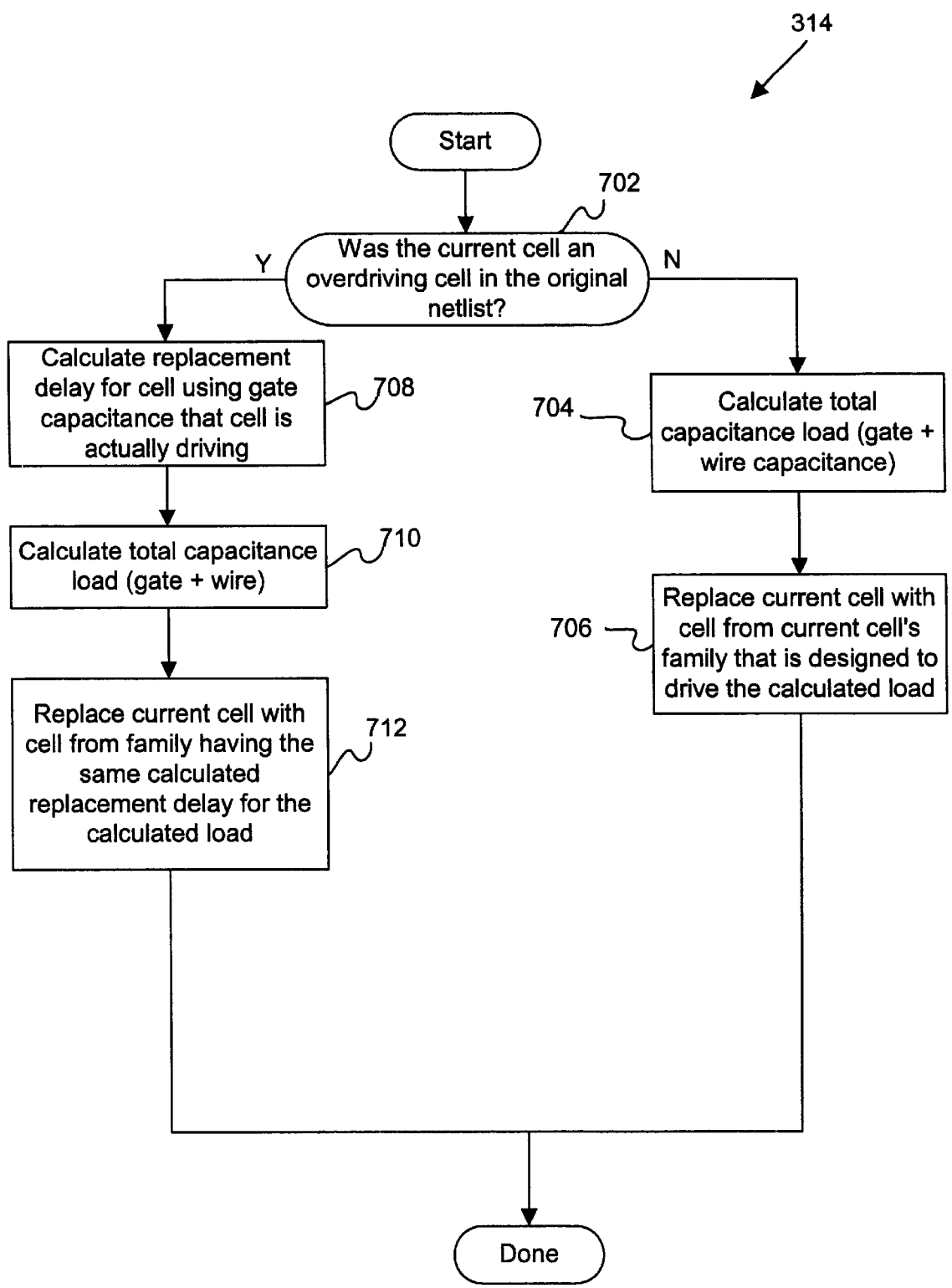
FIG. 7 is a flowchart illustrating the constant replacement delay timing optimization of FIG. 3 in accordance with one embodiment of the present invention.

FIG. 7 is a flowchart illustrating the constant replacement delay timing optimization 314 of FIG. 3 in accordance with one embodiment of the present invention. This procedure is illustrated for a single current cell although it may be applied to each cell of the netlist. In general terms, an original cell is replaced with another cell from the cell family with the same replacement delay, and the replacement cell is capable of driving the original cell's present load, including the wire load generated by the routing process. Initially, it is determined whether the current cell is an overdriving cell in operation 702, which may result from the load slack maximizing timing optimization procedure.

If the current cell is an overdriving cell (i.e., driving less than its natural load), its replacement delay is then calculated in operation 708, using the gate capacitance the cell is actually driving as the load. Total load is then calculated in operation 710 as the sum of the gate and wire capacitances. The cell is then replaced with a cell from the family with the same calculated replacement delay for the calculated load in operation 712. The timing optimization 314 ends. As a result, the delay of signals passing through the replaced cell will not change after the replacement.

If the current cell was not an overdriving cell (i.e., its load consisting of gate capacitances is comparable to its natural load within the limits of load granularity of its cell family), the total capacitance is then calculated for the current cell in operation 704. This calculated capacitance load includes both the gate capacitance as well as the wire capacitance. The current cell is then replaced with a cell from the current cell family that is designed to drive the calculated load in operation 706. The operation 314 for constant replacement delay timing optimization then ends.

Suitable computer systems for use in implementing and controlling the methods in the present invention (e.g., synthesis, driver reassigmnments, timing optimization techniques, wire load constrains calculations, etc.) may be obtained from various vendors (e.g., Silicon Graphics of Mountain View, Calif. or Sun Micro systems of Sunnyvale, Calif.) or custom built by a design circuit synthesis system vendor, such as Synopsis, Inc. of Mountain View, Calif. The above described techniques may be implemented with any suitable combination of hardware and software. For example, the techniques of the present invention may be implemented with any suitable computer program instructions that are embedded within any suitable computer readable medium.

Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
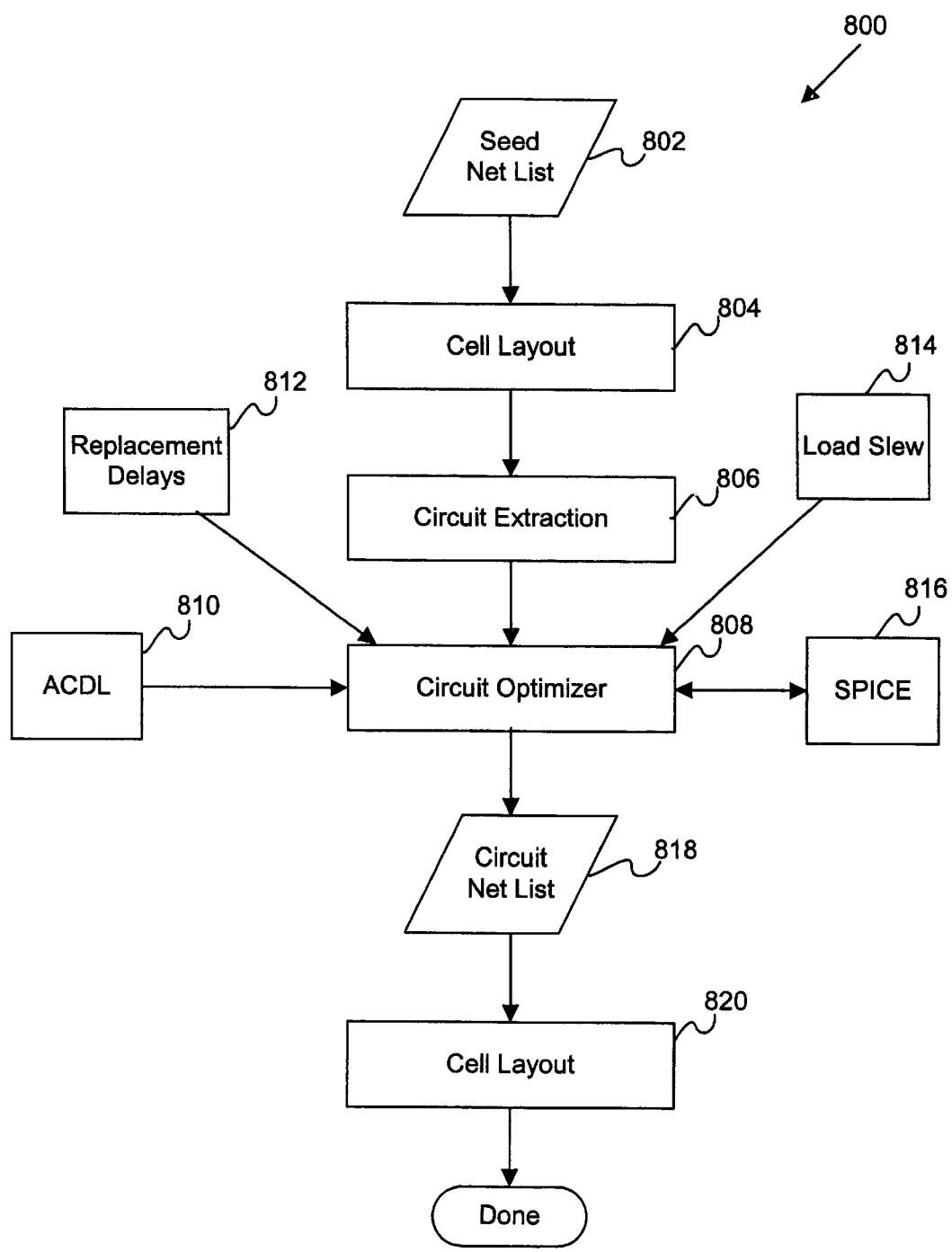
FIG. 8 is a flow diagram illustrating a procedure for generating a cell for a constant replacement delay cell library in accordance with one embodiment of the present invention.

Any suitable techniques may be utilized to generate a cell library having groups of cells with different drives and the same replacement delay. FIG. 8 is a flow diagram illustrating a procedure 800 for generating a constant replacement delay cell library in accordance with one embodiment of the present invention. Initially, a seed netlist is provided in operation 802. The seed netlist is a collection of transistors and their connectivity which when laid out implements a certain logic function. Logic function can be described using any suitable language, such as ACDL 810, which stands for Advanced Cell Description Language. The seed netlist may be created using any suitable technique, such as using schematic capture or entering the netlist manually. When designed manually, the seed netlist is generally designed to meet timing and area requirements, which techniques are well known to those skilled in the art.

Cell layout is then implemented in operation 804 on the provided seed netlist. Circuit extraction is then performed on the cell layout in operation 806. Each transistor is characterized by length 1, width w, the area, perimeter and the resistance of their source and drain regions, which are denoted by $a_d$, $a_s$, $P_d$, $P_s$, $r_d$, $r_s$, As the transistor size changes (1 and w), the parameters $a_d$, $a_s$, $P_d$, $P_s$, $r_d$, $r_s$ change as well. One purpose of using a circuit extractor is to calculate these parameters as well as the parameters for interconnect wires connecting the transistors together. These parameters depend on the layout topology as well as the sizes of transistors. The bulk of cell design effort is in determining the transistor sizes to use for a particular timing specification and generating a compact layout for the cell.

A circuit optimizer 808 transforms the extracted circuit into a new netlist 818 which meets the timing requirements and is power optimized. For example, the circuit optimizer 808 may be specifically configured software tools such as CellOpt™ available from Library Technologies, Inc. of Saratoga, Calif.

In one embodiment, the circuit optimizer may be configured to embed the cell being optimized into an optimization fixture as illustrated in FIG. 2A where the driver 202 is a typical driver with symmetric rise/fall times. Its output drive strength is preferably close to the output drive strength of the majority of cells to be designed. Its rise and fall times can be controlled by the slew 814 input which sets the values of C(s). Load input 814 sets C(l). The replacement delays 812 specifies what the replacement delay for various timing arcs through the cell 204 should be after the transistors have been resized. There could be different delay requirements for different timing arcs through the cell 204. All the timing paths (whether they are coupled to the outputs of cell 204 or not) can be enumerated based on the functional description of the cell given in ACDL format 810. Internal signal paths are factors for power reduction, while signal paths that reach the outputs of the cell are factors for both power reduction and for meeting the timing goals. Circuit optimizer 808 uses numeric optimization techniques where it uses circuit simulator 816 (e.g. SPICE) to measure the timing and power dissipation of the circuit implementation, changes the transistor sizes, recalculates their parameters and simulates again until all the requirements are satisfied. Source/drain area and perimeter values may be updated based on the following extrapolation formulae:

$$a_d = w h_d$$

$$a_s = w h_s$$

$$P_d = b_d(w + h_d)$$

$$P_s = b_s(w + h_s)$$

where the parameters $b_d$, $b_s$, $h_d$, $h_s$ can be calculated using the device parameters of the extracted circuit 806. They may vary depending on the layout topology and the extractor used. If the layout topology and the extractor used do not change, these equations can accurately track device parameters as the device sizes change.

In summary, circuit optimizer 808 produces a new netlist 818 which meets the timing requirements, optimizes power, and incorporates layout effects. If it can be laid out (820) using the original layout topology 804 as the seed netlist 802, the process 800 finishes. Otherwise, the extracted circuit netlist may be based on the new layout 820, and process 800 repeats.

In order to generate a family of constant replacement delay cells which may be indexed by 1, 2, 3 . . . , the process is repeated by setting C(1) defined (814) to $C_0, 2C_0, 3C_0, \ldots$ where $C_0$ is the granularity, and may correspond to typical load per fanout.

In general terms, a constant replacement delay cell library family may be created by first selecting a maximum load that the family is capable of driving. A minimum load is then selected for the family. An incremental load is then selected for the family. A single replacement delay value is then selected for the family. Standard library cells are then generated for the family. Each cell has the same selected replacement delay, a same logic function, and is capable of driving different loads from other cells within the family. The loads associated with the family cells range from the selected minimum load through the selected maximum load in increments of the selected incremental load.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, although the above implementation example describes cells that are first replaced with cells for power optimization purposes (operation 306) and then replaced again for timing optimization purposes (operation 308), a cell may be replaced once with a cell that is optimized to meet both power and timing requirements. Accordingly, the present embodiments are to be considered as illustrative and not restrictive, and the invention is not to be limited to the details given herein, but may be modified within the scope and equivalents of the appended claims.

What is claimed is:

1. A method of generating an integrated circuit (IC) layout design, the method comprising:

providing an initial layout netlist having a plurality of original cells; and replacing a first original cell within the initial layout netlist with a first replacement cell having a different drive than the first original cell's drive but a same replacement delay as the first original cell when the first original cell is not optimal, wherein the first replacement delay of a particular cell is the particular cell's total delay contribution to a particular delay path that includes the particular cell, wherein the first replacement is prior to any routing procedure being performed on the layout netlist, wherein the first replacement cell is capable of driving the first original cell's load, excluding a wire load that is associated with the first original cell and is introduced by a subsequent routing procedure, the first original cell not being optimal when it is incapable of driving its own load, excluding the wire load, the replacement of the first original cell comprising:

determining a total input gate capacitance of the first original cell excluding the wire load;

selecting the first replacement cell from a plurality of possible replacement cells, wherein the selection is made based on which replacement cell is capable of driving a load at least as large as the determined total input gate capacitance; and replacing the first original cell with the selected first replacement cell.

2. A method as recited in claim 1, wherein the first replacement cell is selected to maximize load slack by being capable of driving a load that is substantially equal to the determined total input gate capacitance.

3. A method as recited in claim 1, wherein the replacement is performed on each original cell within the initial layout netlist to thereby generate an intermediate layout netlist.

4. A method as recited in claim 3, further comprising replacing the first replacement cell with a second replacement cell so as to meet a timing goal of the original cell's delay path when the first replacement cell is incapable of meeting its own timing requirements.

5. A method as recited in claim 4, the selection comprising:

determining whether the first replacement cell's timing goal for its delay path is met without accounting for the wire load; and when the timing goal is not met, selecting a cell that has a drive that is next largest sized with respect to the first replacement cell from a plurality of replacement cells having a same replacement delay and replacing the first replacement cell with the second replacement cell.

6. A method as recited in claim 5, wherein the first replacement cell is only replaced when the first replacement cell has a highest load slack of the cells within the delay path.

7. A method as recited in claim 6, wherein the first replacement cell is only replaced when the first replacement cell also has a highest differential delay reduction of the cells within the delay path, where the differential delay reduction is a difference in delay caused by the first and second replacement cells.

8. A method as recited in claim 5, wherein the second replacement is performed on each original cell within the initial layout netlist to thereby generate a final layout netlist until the delay path of the each original cell has met its timing goal.

9. A method as recited in claim 8, further comprising placing and routing cells of the final layout netlist to form a design layout.

10. A method as recited in claim 9, further comprising determining one or more wire constraint(s) for each cell within the final layout netlist, wherein the routing is limited by the determined wire constraint(s).

11. A method as recited in claim 10, wherein the wire constraint(s) are selected from a group consisting of a minimum wire load and a maximum wire load.

12. A method as recited in claim 10, wherein the wire load constraint(s) are balanced for each output of a cell having multiple outputs.

13. A method as recited in claim 9, further comprising replacing the second replacement cell with a third replacement cell that is capable of driving the second replacement cell's load, including its wire load.

14. A computer readable medium for generating an integrated circuit (IC) layout design, the computer readable medium comprising:

computer readable code for providing an initial layout netlist having a plurality of original cells;

computer readable code for replacing a first original cell within the initial layout netlist with a first replacement cell having a different drive than the first original cell's drive but a same replacement delay as the first original cell when the first original cell is not optimal, wherein the first replacement delay of a particular cell is the particular cell's total delay contribution to a particular delay path that includes the particular cell; and a computer readable medium for storing the computer readable codes, wherein the first replacement is prior to any routing procedure being performed on the layout netlist, wherein the first replacement cell is capable of driving the first original cell's load, excluding a wire load that is associated with the first original cell and is introduced by a subsequent routing procedure, the first original cell not being optimal when it is incapable of driving its own load, excluding the wire load, the replacement of the first original cell comprising:

determining a total input gate capacitance of the first original cell excluding the wire load;

selecting the first replacement cell from a plurality of possible replacement cells, wherein the selection is made based on which replacement cell is capable of driving a load at least as large as the determined total input gate capacitance; and replacing the first original cell with the selected first replacement cell.

15. A computer readable medium as recited in claim 14, wherein the first replacement cell is selected to maximize load slack by being capable of driving a load that is substantially equal to the determined total input gate capacitance.

16. A computer readable medium as recited in claim 14, wherein the replacement is performed on each original cell within the initial layout netlist to thereby generate an intermediate layout netlist.

17. A computer readable medium as recited in claim 16, further comprising computer code for replacing the first replacement cell with a second replacement cell so as to meet a timing goal of the original cell's delay path when the first replacement cell is incapable of meeting its own timing requirements.

18. A computer readable medium as recited in claim 17, the selection comprising:

determining whether the first replacement cell's timing goal for its delay path is met without accounting for the wire load; and when the timing goal is not met, selecting a cell that has a drive that is next largest sized with respect to the first replacement cell from a plurality of replacement cells having a same replacement delay and replacing the first replacement cell with the second replacement cell.

19. A computer readable medium as recited in claim 18, wherein the first replacement cell is only replaced when the first replacement cell has a highest load slack of the cells within the delay path.

20. A computer readable medium as recited in claim 19, wherein the first replacement cell is only replaced when the first replacement cell also has a highest differential delay reduction of the cells within the delay path, where the differential delay reduction is a difference in delay caused by the first and second replacement cells.

21. A computer readable medium as recited in claim 18, wherein the second replacement is performed on each original cell within the initial layout netlist to thereby generate a final layout netlist until the delay path of the each original cell has met its timing goal.

22. A computer readable medium as recited in claim 21, further comprising computer code for placing and routing cells of the final layout netlist to form a design layout.

23. A computer readable medium as recited in claim 22, further comprising computer code for determining one or more wire constraint(s) for each cell within the final layout netlist, wherein the routing is limited by the determined wire constraint(s).

24. A computer readable medium as recited in claim 23, wherein the wire constraint(s) are selected from a group consisting of a minimum wire load and a maximum wire load.

25. A computer readable medium as recited in claim 23, wherein the wire load constraint(s) are balanced for each output of a cell having multiple outputs.

26. A computer readable medium as recited in claim 22, further comprising computer code for replacing the second replacement cell with a third replacement cell that is capable of driving the second replacement cell's load, including its wire load.

* * * * *